United States Patent Office 3,297,631
Patented Jan. 10, 1967

---

1

3,297,631
NOVEL PHENOLIC PHOSPHORUS STABILIZERS
FOR POLYOLEFINS
Delos E. Bown, Baytown, Tex., and Robert I. McDougall, Newark, N.J., assignors to Esso Research and Engineering Company
No Drawing. Filed Oct. 24, 1965, Ser. No. 505,056
22 Claims. (Cl. 260—45.95)

This application is a continuation-in-part of Serial No. 352,366, filed March 16, 1964, entitled "Stabilizer for Polyolefins" (which in turn is a continuation-in-part of Serial No. 100,538, filed April 4, 1961), and Serial No. 125,677, filed July 21, 1961, by Delos E. Bown, Norman P. Neureiter, and Robert I. McDougall (which was allowed June 24, 1965, to Delos E. Bown and Robert I. McDougall).

The present invention is directed to new compositions of matter which are stabilizers, especially for polyolefins. More particularly, the invention is concerned with the condensation of phosphorus compounds with bisphenols and trisphenols which are stabilizers for polyolefin compositions such as polypropylene. In its most specific aspect, the invention is concerned with polyolefin compositions containing the stabilizers of the present invention which resist oxidative degradation.

The present invention may be briefly described as condensation products of phosphorus compounds with bisphenols and trisphenols which may be represented by the following structures:

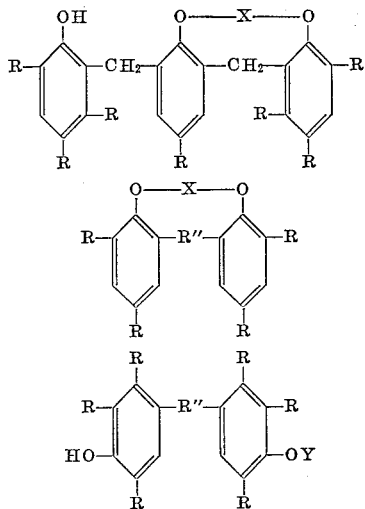

Where:
X is selected from the following: $>P-OR'$; $>P-R'$;

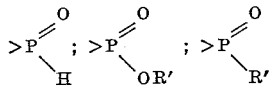

and Y is selected from the following: $-P(OR')_2$;

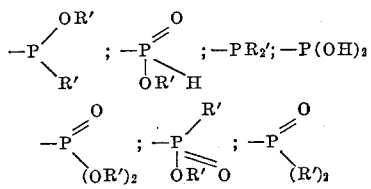

2

R is hydrogen, an alkyl group having 1 to 16 carbon atoms, or an aryl group, or a combination thereof;
R' is an alkyl group having 1 to 16 carbon atoms or an aryl group; and
R" is an alkylidene having 1 to 16 carbon atoms or an aryl-substituted alkylidene.

The condensation products of the present invention are produced by condensing a triphenol, a 2,2'-bisphenol, or a 4,4'-bisphenol with certain phosphorus compounds. The condensation products are of two types: one where the trisphenol and 2,2'-bisphenols are condensed to form cyclic compounds by the condensation of the phosphorus compound reacting with two hydroxy groups, and the second type is the condensation of a 4,4'-bisphenol wherein the phosphorus compound reacts with only one hydroxy group. The phosphorus compounds are selected so that they will contain at least two phenoxy radicals when condensing a trisphenol or a 2,2'-bisphenol and at least one phenoxy radical in the condensation with a 4,4'-bisphenol. The phenoxy substituted phosphorus compounds are preferred in that phenol is produced in the condensation which is easily removed. However, aryloxy or alkoxy substituted phosphorus compounds generally may be used in the condensation.

The condensation reaction may be carried out at temperatures within the range from about 80° to about 120° C. The condensation reaction is conducted in the presence of a catalytic amount of a base, such as an alkali metal such as sodium, potassium, and lithium or potassium t-butoxide or the like. A catalytic amount of the base used may be from about 0.001% to 0.05% by weight, based on the total reactants. The reactants are used such that a mol of the phosphorus compound will condense with a mol of the trisphenol, 2,2'-bisphenol, or 4,4'-bisphenol. It is preferred, however, to use an excess of the phosphorus compound. The phosphorus compound and phenol will be in a molar ratio in a range from about 4:1 to 1:1. The condensation products of the present invention and their preparation may be illustrated by the following structural equations showing specific examples. By illustrating the condensation products in this manner, the chemistry, as well as the reaction and resultant structure of the new compositions may be illustrated. Each of the phosphorus compounds which are condensed has an $(OR')_n$ where $n$ must be at least 2 in the case of the condensation of a trisphenol and the 2,2'-bisphenol, and where $n$ is 1 in the case of the 4,4'-bisphenol, and R' is preferably an aryl group and specifically a phenyl group. R' may be an alkyl, but the ease of handling the condensation reaction mixture is much greater when R' is phenyl.

The phosphorus compounds of the trisphenols may be prepared as illustrated by the following structural equations, showing a specific example using phosphite compounds in the condensation:

(A)

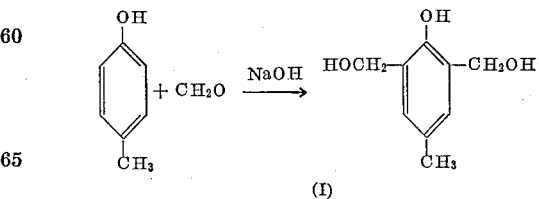

(I)

(B)

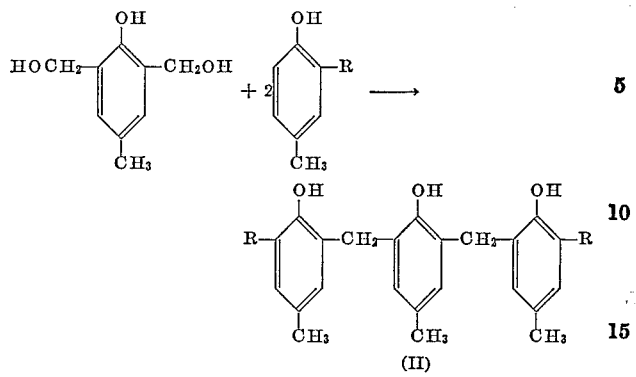

(C)

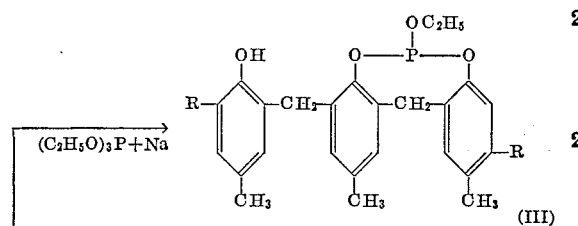

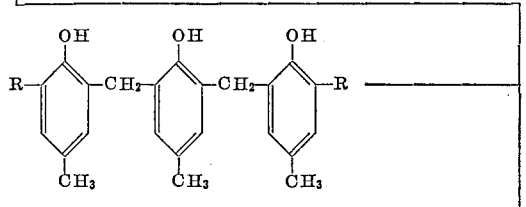

(D)

Where:

R=t-butyl

Compounds of the nature of Compounds III and IV may suitably be employed in stabilizing a solid polymer of an alpha olefin having 2 to 8 carbon atoms in the molecule in which the condensation product of the present invention is suitably added thereto and homogeneously incorporated therein in small but sufficient amounts in the range from about 0.05 to about 1.0 percent by weight of a solid polymer. A preferred amount is in the range from about 0.1 to about 0.5 percent by weight. Other specific compounds of the nature of Compounds III and IV which are useful in the present invention include those having 1 to 16 carbon atoms in the alkyl group or mixed alkyl-aryl groups. Specific examples include:

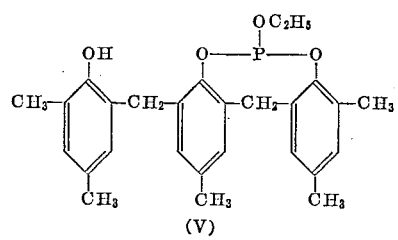

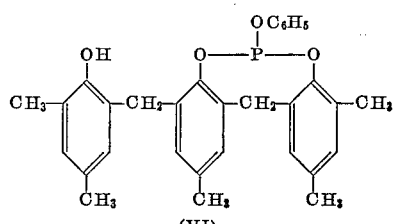
(VI)

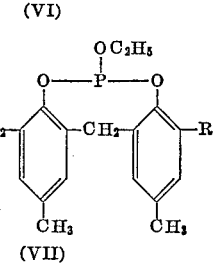
(VII)

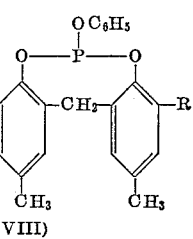
(VIII)

Where:

R is $-\underset{\underset{CH_3}{|}}{\overset{\overset{CH_3}{|}}{C}}-CH_2-\underset{\underset{CH_3}{|}}{\overset{\overset{CH_3}{|}}{C}}-CH_3$

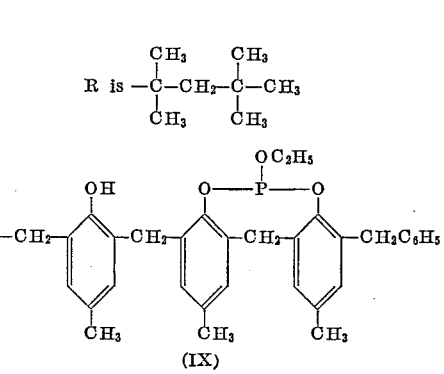
(IX)

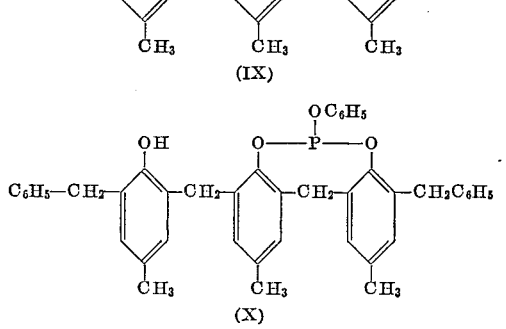
(X)

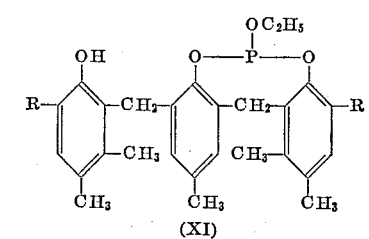
(XI)

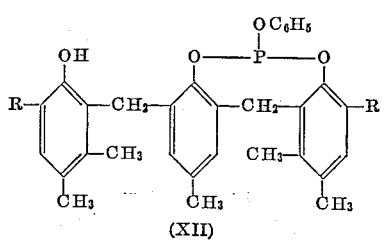
(XII)

Where:

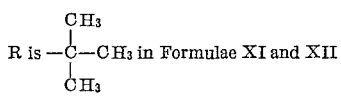

R is in Formulae XI and XII

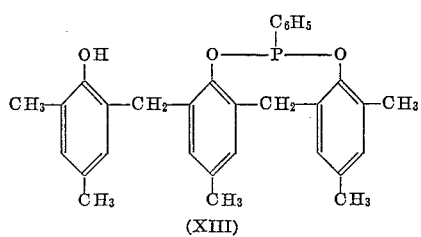
(XIII)

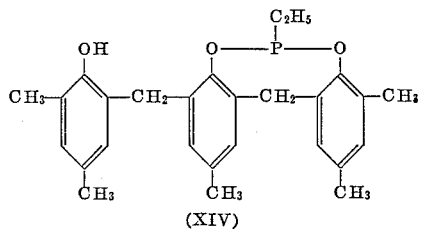
(XIV)

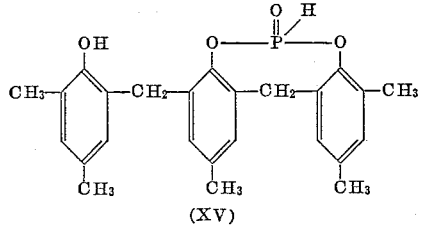
(XV)

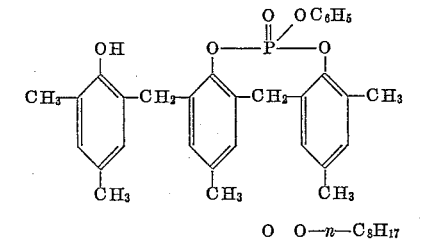
(XVI)

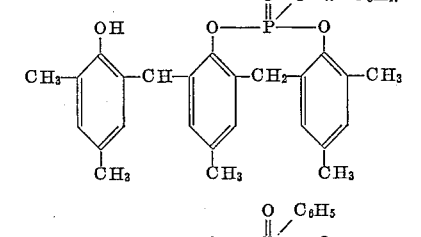
(XVII)

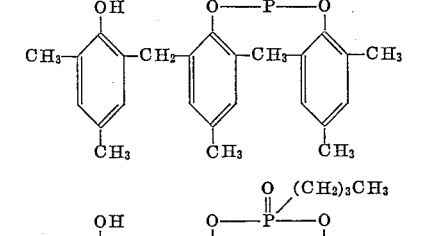
(XVIII)

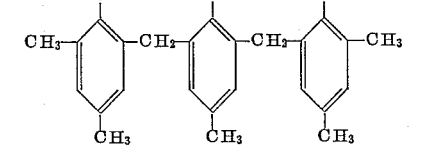
(XIX)

When the 2,2'-bisphenols are condensed with the phosphorus compounds two hydroxy radicals of the bisphenol are involved similarly as in the condensation of the trisphenols. Thus, the condensation products of the 2,2'-bisphenols are analogous to those already illustrated by the trisphenol condensation products. Specific 2,2'-bisphenol condensation products are illustrated by the following structural formulae:

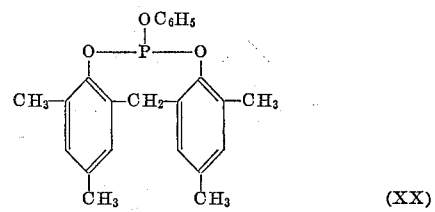
(XX)

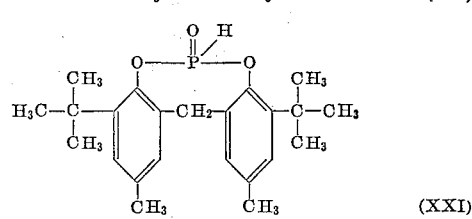
(XXI)

Other phosphorus compounds of the present invention which are useful in stabilizing polyolefins are illustrated by the following structural formulae:

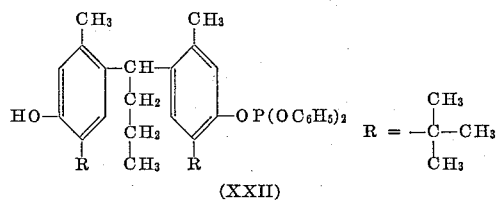
(XXII)
[mono-diphenylphosphite of 4,4'-butylidenebis (3-methyl-6-t-butylphenol)]

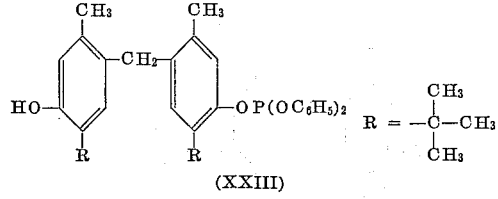
(XXIII)
[mono-diphenylphosphite of 4,4'-methylenebis (3-methyl-6-t-butylphenol)]

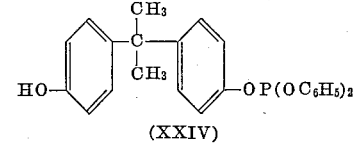
(XXIV)
[mono-diphenylphosphite of 4,4'-isoproplyidenebisphenol]

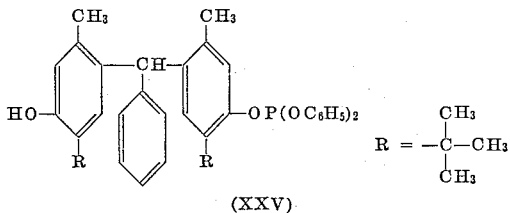
(XXV)
[mono-diphenylphosphite of 4,4'-phenylmethylidenebis (3-methyl-6-t-butylphenol)]

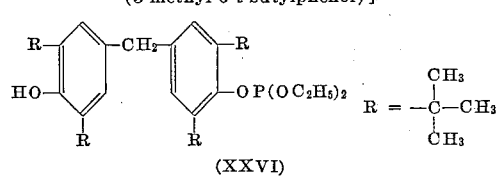
(XXVI)
[mono-diphenylphosphite of 4,4'-phenylmethylidenebis (3-methyl-6-t-butylphenol)]

The foregoing formulae illustrate the condensation of 4,4'-bisphenols with specific phosphite compounds. In this condensation reaction only one hydroxy radical of the 4,4'-bisphenol reacts with the phosphorus compounds. Other phosphorus compounds condensed with 4,4'-bisphenols will produce compounds having the following structural formulae:

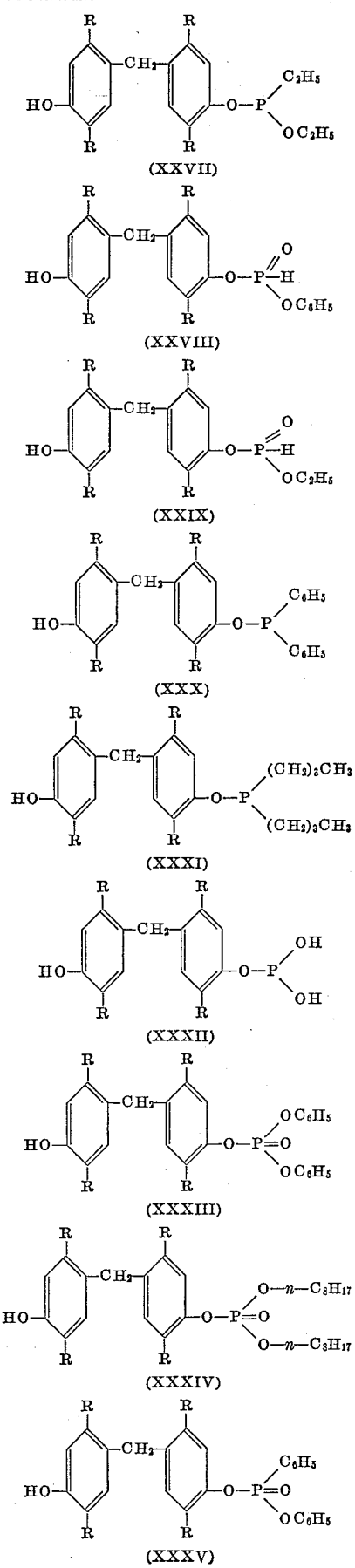

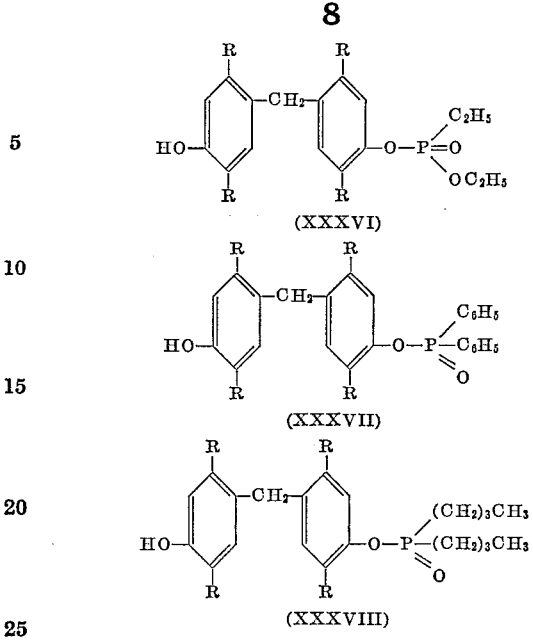

The phosphorus compounds which are reacted with the trisphenols or bisphenols according to the present invention, may suitably include the triarylphosphites as exemplified by triphenyl phosphite, tris(4-nonylphenyl) phosphite, tris(4-octylphenyl) phosphite and triscresyl phosphite; the trialklphosphites as exemplified by triethylphosphite, tri-n-octylphosphite, tris(2 - ethylhexyl) phosphite, tris(2-chloroethyl) phosphite, tris (tridecyl) phosphite, and tri-hexyl phosphite. The phosphite employed may also be an aryl-alkyl phosphite, such as a mixed 2-ethylhexyloctyl-phenyl phosphite, or a monoaryl or alkyl phosphite such as phenyl phosphite or ethyl phosphite.

Diaryl aryl phosphonites may be suitably included such as diphenyl phenyl phosphonite, or dialkyl alkyl phosphonites such as diethyl ethyl phosphonite, as well as mixed aryl alkyl phosphonites such as diphenyl n-octyl phosphonite. Hydrogen phosphites may also be employed such as diaryl hydrogen phosphites exemplified by diphenyl hydrogen phosphite, dicresyl hydrogen phosphite, and bis(4-octylphenyl) phosphite, as well as dialkyl hydrogen phosphites exemplified by diethyl hydrogen phosphite, bis(2-ethylhexyl) hydrogen phosphite, and di-n-butyl hydrogen phosphite.

Diaryl aryl phosphinites such as diphenyl phenyl phosphinite, dicresyl cresyl phosphinite, and bis(4-octylphenyl) 4-octylphenyl phosphinite, as well as dialkyl alkyl phosphinites as exemplified by di-n-butyl n-butyl phosphinite and diethyl ethyl phosphinite may be used. The phosphinites employed may also be a mixed aryl-alkyl phosphinite, such as diphenyl ethyl phosphinite or di-n-butyl phenyl phosphinite.

Furthermore, the phosphorus compounds may suitably include the triaryl phosphates, such as triphenyl phosphate, tricresylphosphate, tris(p-nonylphenyl) phosphate, and tris (2-ethylhexyl) phosphate. Trialkyl phosphates may be employed as well, such as triethyl phosphate, tri-n-octyl phosphate, and tri-n-butyl phosphate. Mixed aryl-alkyl phosphates may be employed, such as a mixed n-octylbutylphenyl phosphate.

In addition, diaryl aryl phosphonates may be used, for example, diphenyl phenyl phosphonate, bis(4-octylphenyl) phenyl phosphonate, bis(4-nonylphenyl) 4-nonylphenyl phosphonate. Also may be employed, dialkyl alkyl phosphonates, such as di-n-butyl phosphonate, diethyl n-octyl phosphonate and di-2-ethylhexyl 2-ethylhexyl phosphonnate and di-2-ethylhexyl 2-ethylhexyl phosphonate. Mixed aryl-alkyl phosphonates may be used, such as diphenyl 2-ethylhexyl phosphonate.

The various phosphinates may suitably be included such as the aryl diaryl phosphinates, phenyl diphenyl phosphinate, phenyl bis(4-octylphenyl) phosphinate, and the several cresyl dicresyl phosphinates. The phosphinates would also include the alkyl dialkyl phosphinates, such as ethyl diethyl phosphinate, n-octyl di-n-octyl phosphinate, 2-ethylhexyl di-2-ethylhexyl phosphinate, and ethyl di-n-butyl phosphinate, and ethyl di-n-butyl phosphinate. Mixed phosphinates may also be employed such as phenyl di-2-ethylhexyl phosphinate.

The phenols which are reacted with the phosphorus compounds according to the present invention are selected from the trisphenols derived from $\alpha^2,\alpha^6$-bis (2-hydroxyphenyl)mesitol, the 4,4'-bisphenols and the 2,2'-bisphenols. The phenols which are particularly suitable for stabilizing polyolefins have at least one $C_4$ or greater tertiary alkyl group in the position ortho to the hydroxy group. Suitable phenols may include 4,4'-(1,1-butylidene)bis(3-methyl-6-t-butylphenol); 4,4'-isopropylidenebisphenol; $\alpha^2,\alpha^6$-bis(3 - t - butyl-5-methyl-2-hydroxyphenyl-mesitol; 4,4'-methylenebis(2-methyl-6-t-butylphenol); 4,4'-methylenebis(3 - methyl-6-t-butylphenol); $\alpha^2,\alpha^6$-bis(3,5-dimethyl-2-hydroxyphenyl)-mesitol; $\alpha^2,\alpha^6$-bis(3-benzyl-5-methyl-2-hydroxyphenyl)-mesitol; $\alpha^2,\alpha^6$-bis(3,5,6-trimethyl-2-hydroxyphenyl)-mesitol; 4,4'-methylenebis(2,6-di-t-butylphenyl); 4,4'-phenyl-methylenebis(3-methyl-6-t-butylphenol); 2,2'- methylenebis(4,6-dimethylphenol); 2,2'-methylenebis(4-methyl-6-t-butylphenol); 2,2'-butylidenebis(4-methyl-6-t-butylphenol); 2,2'-isopropylidenebis(6-t-butylphenol); and 2,2'-methylenebis(3,4-dimethyl-6-t-butylphenol).

The phosphorus compounds of the present invention have utility in many applications where the phenol from which the compound is derived would be used. The phosphorus compounds have been especially effective as stabilizers in polyolefins. When the compounds of the present invention are incorporated in polyolefins as stabilizers, the compounds are added with a sulfur-containing compound having the following formulae:

$$R—(CH_2)_2—Aw—(CH_2)_2—R$$
or
$$R—(CH_2)_2—A—R'—A—(CH_2)_2—R$$

where:

A is S or S=O
$w$ is 1, 2, 3 or 4
R is $CH_3—(CH_2)_x—OOC—(CH_2)_y—$ or $CH_3—(CH_2)_y—$ and $x=0$ to 20, $y=0$ to 3
and R' is —$(CH_2)_z$—

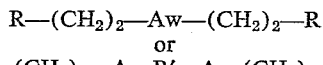

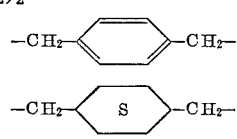

and $z=1$ to 5

Specific sulfur-containing costabilizer compounds which may be incorporated in the polyolefins with the phosphorus compounds of the present invention are exemplified by dilaurylthiodipropionate, distearylthiodipropionate, lauryl-stearylthiodipropionate, dilaurylsulfoxydipropionate, distearyltrithiodipropionate, 19,24-dithiotetracontane, 19, 25-dithiohentetetracontane, dicetyl sulfide, dicetyl disulfide, and the like. These compounds may be used in amounts from about 0.05 to about 1.0 percent by weight with a preferred amount from about 0.1 to about 0.5 percent by weight.

The polyolefin polymers in accordance with the present invention are polymers of olefins having 2 to 8 carbon atoms in the molecule and may suitably be exemplified by polyethylene, polypropylene, ethylenepropylene copolymers, ethylene-butene-1 copolymers, ethylene-pentene-1 copolymers, and the like, having molecular weights in the range from about 10,000 to about 1,000,000. These polymers are produced by polymerization of the corresponding olefins employing the Ziegler-type polymerization catalyst which is obtained by at least partially reducing in solution in a diluent a halide of an amphoteric metal selected from Groups IVB, VB, VIB, and VIII of the Periodic System of Elements (see, for example, the Henry D. Hubbard Periodic Chart of the Elements, 1947 Ed., revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride, and the like.

In preparing catalysts suitable for use in forming the polymer treated in accordance with the present invention, an amphoteric metal halide is reduced in solution in a nonreactive, nonpolar organic diluent in any suitable manner such as by means of chemical reaction with a suitable chemical compound having reducing properties, by irradiation, etc. This is done to reduce at least a portion, and preferably more than about 30 percent of the amphoteric metal halide, to a lower valence state. The product of the reduction step, comprising the diluent and at least partially reduced amphoteric metal halide, is employed as the medium in which olefin polymerization is effected. The diluent to be employed should be nonreactive, nonpolar organic medium in which the amphoteric metal halide starting material is soluble to an extent at least sufficient to provide an 0.1 weight percent solution of amphoteric metal halide starting material. Thus, for example, in preparing the polymerization medium, an 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, and mixtures thereof, or other saturated petroleum hydrocarbons. A particularly desirable diluent is n-heptane. It will be understood that other hydrocarbon diluents may be used, such as aromatic diluents (benezene, xylene, etc.), halogenated aromatic hydrocarbons (monochlorobenzene, dichlorobenzene, etc.), gas-oil distillate fractions obtained from the catalytic cracking of virgin gas-oil feedstocks, diesel oil, etc. It will be understood that, if desired, mixtures of two or more compatible, miscible diluents may be employed. The diluent should be substantially completely free from oxygen, water, and similar compounds of strong polarity which are reactive with the products obtained by reduction of the amphoteric metal halide.

The nonpolar organic liquid in which the slurry is formed may suitably be identical with the diluent in which the catalyst is formed for polymerizing the olefinic compounds.

The polymerization reaction is suitably conducted at a temperature in the range from about —60° to about 400° F., preferably at about room temperature. Higher temperatures may be employed but are generally undesirable in that catalyst decomposition may be encountered. Subatmospheric pressures and pressures up to about 250 atmospheres may be employed in forming the polymer treated in accordance with the present invention. It is generally preferable to employ in the polymerization technique a comparatively low pressure, and specifically it is desirable to employ atmospheric pressure. Reaction times of about 60 minutes are usually required, although reaction time may vary within the range of about 10 minutes to about 24 hours.

The olefin polymers of the type described and illustrated herein are produced by a catalyst of the nature described and having molecular weights as recited which are essentially insoluble in the nonpolar organic liquid and form a slurry of polymerized olefins therein.

These polymers are suitably quenched by adding alcohol, such as methyl alcohol, thereto to deactivate any catalyst, and additional amounts of methyl alcohol are added to precipitate the insoluble polymers from the resultant slurry. The polymer particles are separated and recovered from the slurry and are then treated by adding to them the compounds of the present invention along with costabilizers or other antioxidants of the nature illustrated before.

In employing the phosphorus compounds of the present invention, they may be suitably added to the polyolefin in a solution of an aromatic hydrocarbon and sprayed over pellets or particles of the polyolefin and the resulting mixture then extruded through a suitable extrusion device to form a homogeneous mixture. The phosphorus compounds may be added as such to the polymer particles, and the resulting mixture milled or extruded or passed through other mixing devices to intimately admix the polymer particles with the phosphorus compounds of the present invention to form a homogeneous mixture.

The present invention will be further illustrated by the following specific examples and by data which is exemplary in nature, and the present invention is not to be considered limited thereto. The oxidative stability is illustrated by the following data wherein compounds of the nature of Compounds II, III, and IV, shown in the foregoing equations, were added to polypropylene and subjected to the oxidative stability tests:

$\alpha^2,\alpha^6$-Bis(3-t-butyl-5-methyl-2-hydroxyphenyl) - mesitol, Compound II.—98.4 g. (0.6 mol) of 2-t-butyl-4-methylphenol and 50 ml. of n-heptane were placed in a three-neck flask equipped with stirring, a water trap, a thermometer, and an inert gas blanket. While stirring vigorously, 16.8 g. (0.1 mol) of the above 2,6-dimethylol-4-methylphenol was added in one portion. The mixture was heated to 125° C. to effect solution, and then 4 ml. of concentrated HCl was added. The temperature and stirring were maintained for 36 hours while the water formed in the reaction was gradually removed. The solution was then cooled to room temperature, whereupon a white precipitate came down which was filtered and washed with petroleum ether and dried. There was obtained 9.7 g. (21% yield) of the desired product, Compound II, M.P. 174.5°–175.5° C.

Dimonoethylphosphite of $\alpha^2,\alpha^6$-bis(3-t-butyl-5-methyl-2-hydroxyphenyl)-mesitol, Compound III.—13.8 g. (0.3 mol) of Compound II and 100 ml. of triethylphosphite, together with a small piece of sodium (about half the size of a grain of rice) were refluxed under slight vacuum for 5 days. The excess triethylphosphite was then removed under high vacuum, and the resulting solid was washed with several portions of petroleum ether. After recrystallization, there was obtained 6.8 g. (42.5% yield)

TABLE I

| Sample No. | Stabilizer System | Wt. Percent | Color of Polymer Pad | Oxidative Stability, Days [a] |
|---|---|---|---|---|
| 1 | No stabilizer | | White | <1 |
| 2 | DLTDP [b] | 0.2 | do | <1 |
| 532 | Compound II | 0.2 | Light brown | 4 |
| 539 | Compound III | 0.2 | White | 6 |
| 745 | Compound IV | 0.1 | Off white | 4 |
| 526 | DLTDP,[b] Compound II | 0.3, 0.1 | Light brown | 20 |
| 511 | DLTDP,[b] Compound III | 0.3, 0.1 | White | 28 |
| 729 | DLTDP,[b] Compound IV | 0.3, 0.1 | Off white | 46 |
| 625 | Dicetyl sulfide,[c] Compound III | 0.3, 0.1 | White | 22 |
| 653 | BTPX,[d] Compound III | 0.3, 0.1 | do | 30 |

[a] Tested at 250° C. while passing 10 cc. air/min. through the sample.
[b] Dilaurylthiodipropionate.
[c] $C_{16}H_{33}$—S—$C_{16}H_{33}$.

[d] Bis(tetradecylmercapto)-p-xylylene ($C_{14}H_{29}$—S—$CH_2$—  —$CH_2$—S—$C_{14}H_{29}$).

It will be clear from the data that Compound II, while exhibiting oxidative stability to polypropylene for 20 days, discolored the polymer and therefore is considered unsuitable for preparing polypropylene compositions acceptable to the market. On the other hand, Compounds III and IV of the present invention effect a marked improvement over Compound II and do not cause discoloration of polymer. Additionally, Compounds III and IV exhibit good stabilizing efficiency in polypropylene when used with dilaurylthiodipropionate or dicetyl sulfide, or bis(tetradecylmercapto)-p-xylylene, it being noted that neither Compound II, Compound III, nor Compound IV were particularly effective without the employment of a costabilizer. Especially to be noted is the considerable improvement in stabilizing efficiency of Compound IV over Compounds II or III, suggesting that an aryl phosphite is preferred over an alkyl phosphite.

While the improvement has been described with respect to employment of Compounds III and IV, other compounds of the nature described herein may be used. As examples of these other compounds may be mentioned the compounds corresponding to Compounds III and IV in which the phosphite is trihexylphosphite, triisooctylphosphite, and tris(4-nonylphenyl) phosphite.

As specific examples of the present invention, Compounds III and IV were prepared as follows:

*2,6-dimethylol-4-methylphenol.*—This compound was prepared according to the method of D. J. Beaver, R. S. Schumond, and P. J. Stoffel, Journal American Chemical Society, vol. 75, page 5579 (1953).

of the desired product, Compound III, M.P. 214°–215° C.

*Dimonophenylphosphite of $\alpha^2,\alpha^6$-bis(3-t-butyl-5-methyl - 2 - hydroxyphenyl)-mesitol, Compound IV.*—46.0 g. (0.1 mol) of Compound II and 31 g. (0.1 mol) of triphenylphosphite, together with a small piece of sodium (about half the size of a grain of rice) were heated with stirring under a vacuum (1–2 mm.), and the liberated phenol collected in a trap cooled with ice water. After the theoretical amount of phenol had been collected (0.2 mol, 18.8 g.), the mixture was cooled to room temperature and there was recovered a quantitative yield of Compound IV, a colorless crystalline solid, M.P. 140°–143° C.

In order to further illustrate the present invention, the following specific mixtures were made.

EXAMPLE 1

23.0 g. $\alpha^2,\alpha^6$-bis(3-t-butyl-5-methyl-2-hydroxyphenyl)-mesitol
31.0 g. triphenyl phosphite
20.9 g. triisooctyl phosphite

EXAMPLE 2

11.4 g. 4,4'-isopropylidenebisphenol
31.0 g. triphenyl phosphite
20.9 g. triisooctyl phosphite

EXAMPLE 3

17.0 g. 4,4'-methylenebis(2-methyl-6-t-butylphenol)
31.0 g. triphenyl phosphite
20.9 g. triisooctyl phosphite

EXAMPLE 4

17.9 g. 4,4'-thiobis(2-methyl-6-t-butylphenol)
31.0 g. triphenyl phosphite
20.9 g. triisooctyl phosphite

EXAMPLE 5

17.0 g. 4,4'-methylenebis(3-methyl-6-t-butylphenol)
31.0 g. triphenyl phosphite
20.9 g. triisooctyl phosphite These several mixtures of Examples 1 to 5 were heated to 100° C., and a catalytic amount of 0.01 percent by weight of metallic sodium was added and the heating continued for one additional hour. A product was recovered in which an exchange had been made between the phenol and the phosphites. To each of the resulting products, there was added 0.05 mol of zinc 2-ethylhexanoate. The several stabilizer systems of Examples 1 to 5, which had been reacted in the presence of metallic sodium, were then employed to stabilize polypropylene by addition thereto. In conjunction therewith, the several mixtures, which were not reacted, were also added to polypropylene and compared therewith in admixture with dilaurylthiodipropionate, dilaurylthiodipropionate also being added to the product produced in accordance with the present invention. These several compositions were then tested for oxidative stability as shown in Table II.

phosphite, and 20.9 g. (0.05 mol) of triisooctyl phosphite, together with a small piece of sodium (about 0.01 g.) were heated under an atmosphere of nitrogen at 100° C. for one hour. The resulting product, after cooling to room temperature, was a colorless oil.

The following examples further serve to illustrate the subject of this invention:

MIXTURE I 19.1 g. 4,4' - (1,1 - butylidene)bis(3 - methyl - 6 - t - butylphenol)
31.0 g. Triphenyl phosphite
20.9 g. Triisooctyl phosphite

MIXTURE II 20.0 g. 4,4' - (1,1 - butylidene)bis(3 - methyl - 6 - t - butylphenol)
30.0 g. Triphenyl phosphite

MIXTURE III 20.0 g. 4,4' - (1,1 - butylidene)bis(3 - methyl - 6 - t - butylphenol)
30.0 g. Triphenyl phosphite
20.0 g. Tris(tridecyl) phosphite

TABLE II
*Stability of polypropylene with the new stabilizer system*

| Sample No. | Stabilizer System | Wt. Percent | Oxidative Stability, Days [a] |
|---|---|---|---|
| 542 | DLTDP [b] | 0.3 | |
|  | $\alpha^2,\alpha^6$-bis(3-t-butyl-5-methyl-2-hydroxyphenyl)-mesitol | 0.03 | 13 |
|  | Triphenyl phosphite | 0.04 | |
|  | Triisooctyl phosphite | 0.03 | |
| 543 | DLTDP,[b] Example 1 (reacted) | 0.03, 0.1 | 25 |
| 544 | DLTDP [b] | 0.3 | |
|  | 4,4'-isopropylidenebisphenol | 0.02 | 1 |
|  | Triphenyl phosphite | 0.05 | |
|  | Triisooctyl phosphite | 0.03 | |
| 545 | DLTDP,[b] Example 2 (reacted) | 0.3, 0.1 | 5 |
| 569 | DLTDP [b] | 0.3 | |
|  | 4,4'-methylenebis(2-methyl-6-t-butylphenol) | 0.025 | 3 |
|  | Triphenyl phosphite | 0.045 | |
|  | Triisooctyl phosphite | 0.03 | |
| 558 | DLTDP,[b] Example 3 (reacted) | 0.3, 0.1 | 16 |
| 570 | DLTDP [b] | 0.3 | |
|  | 4,4'-thiobis(2-methyl-6-t-butylphenol) | 0.025 | 5 |
|  | Triphenyl phosphite | 0.045 | |
|  | Triisooctyl phosphite | 0.03 | |
| 559 | DLTDP,[b] Example 4 (reacted) | 0.3, 0.1 | 27 |
| 571 | DLTDP [b] | 0.3 | |
|  | 4,4'-methylenebis(3-methyl-6-t-butylphenol) | 0.02 | 2 |
|  | Triphenyl phosphite | 0.045 | |
|  | Triisooctyl phosphite | 0.03 | |
| 682 | DLTDP,[b] Example 5 (reacted) | 0.3, 0.1 | 40 |

[a] 150° C., 10 cc. air/min.
[b] Dilaurylthiodipropionate.

From an inspection of the data in Table II, it will be clear that the products produced in accordance with the present invention gave considerable improvement in stabilizing efficiency when they were tested and used in polypropylene. It is to be further noted that the stabilizers of the present invention are considerably more effective than the simple mixtures of the several compounds.

The stabilizers of the present invention may be suitably prepared in the following manner, illustrated with Example 5. 17.0 g. (0.05 mol) of 4,4'-methylenebis(3-methyl-6-t-butylphenol), 31.0 g. (0.1 mol) of triphenyl

MIXTURE IV 20.0 g. 4,4' - (1,1 - butylidene)bis(3 - methyl - 6 - t - butylphenol)
30.0 g. Triisooctyl phosphite

MIXTURE V 20.0 g. 4,4' - (1,1 - butylidene)bis(3 - methyl - 6 - t - butylphenol)
30.0 g. Mixed 2-ethylhexyloctylphenyl phosphite

MIXTURE VI 20.0 g. 4,4' - (1,1 - butylidene)bis(3 - methyl - 6 - t - butylphenol)
30.0 g. Tris(2-chloroethyl) phosphite

MIXTURE VII 20.0 g. 4,4' - (1,1 - butylidene)bis(3 - methyl - 6 - t - butylphenol)
30.0 g. Triphenyl phosphite
20.0 g. Tris(2-chloroethyl) phosphite Each mixture was heated for two hours at 100° C. after addition of a catalytic amount of sodium. The stability data for polypropylene containing these stabilizer systems are shown in Table III.

EXAMPLE 7

Using the same procedure as in Example 6, 17.0 g. (0.05 mol) of 4,4'-methylenebis(3-methyl - 6 - t-butylphenol), 15.5 g. (0.05 mol) of triphenyl phosphite, and a small piece of sodium were placed in the flask and the mixture heated under vacuum until 4.7 g. (0.05 mol) of phenol had been collected. A quantitative yield of Compound XXIII was obtained.

TABLE III

| Sample No. | Stabilizer System | Wt. Percent | Oxidative Stability, Days [a] |
|---|---|---|---|
| 586 | DLTDP,[b] Compound I,[c] Triphenyl phosphite, Triisooctyl phosphite. | 0.3, 0.02, 0.04, 0.02 | 4 |
| 587 | DLTDP,[b] Product of Mixture I | 0.3, 0.1 | 34 |
| 657 | DLTDP,[b] Compound I,[c] Triphenyl phosphite | 0.3, 0.02, 0.04 | 5 |
| 664 | DLTDP,[b] Product of Mixture II | 0.3, 0.1 | 62 |
| 658 | DLTDP,[b] Compound I,[c] Triphenyl phosphite, Tris (tridecyl) phosphite. | 0.3, 0.02, 0.04, 0.02 | 5 |
| 665 | DLTDP,[b] Product of Mixture III | 0.3, 0.1 | 32 |
| 659 | DLTDP,[b] Compound I,[c] Triisooctyl phosphite | 0.3, 0.02, 0.04 | 7 |
| 666 | DLTDP,[b] Product of Mixture IV | 0.3, 0.1 | 15 |
| 660 | DLTDP,[b] Compound I,[c] Mixed 2-ethylhexyloctylphenyl-phosphite. | 0.3, 0.02, 0.04 | 4 |
| 667 | DLTDP,[b] Product of Mixture V | 0.3, 0.1 | 21 |
| 661 | DLTDP,[b] Compound I,[c] Tris (2-chloroethyl) phosphite | 0.3, 0.02, 0.04 | 6 |
| 668 | DLTDP,[b] Product of Mixture VI | 0.3, 0.1 | 20 |
| 662 | DLTDP,[b] Compound I,[c] Triphenyl phosphite, Tris(2-chloroethyl) phosphite. | 0.3, 0.02, 0.04, 0.02 | 5 |
| 669 | DLTDP,[b] Product of Mixture VII | 0.3, 0.1 | 27 |

[a] 150° C., 10 cc. air/min.
[b] Dilaurylthiodipropionate.
[c] 4,4'-(1,1-butylidene)bis(3-methyl-6-t-butylphenol).

As shown by Table III, a considerable increase in stabilizing efficiency is achieved by the practice of this invention. It is to be understood that the costabilizer used in each example above, dilaurylthiodipropionate, is only one of a number of known costabilizers, and the practice of this invention is not confined to the exclusive use of this costabilizer.

For example, dicetyl sulfide, bis(tetradecylmercapto)-p-xylylene, bis(octadecylmercapto)-p-xylylene, and the like, may be used as illustrated below:

| Sample No. | Stabilizer System | Wt. Percent | Oxidative Stability, Days |
|---|---|---|---|
| 671 | Dicetylsulfide, Product of Mixture I. | 0.3, 0.1 | 27 |
| 672 | Bis(tetradecylmercapto)-p-xylene. Product of Mixture I. | 0.3, 0.1 | 56 |

Compounds in accordance with the present invention were prepared as follows:

EXAMPLE 6

In a round-bottom flask equipped with a magnetic stirrer, a side arm and cold trap, and thermometer was placed 38.2 g. (0.1 mol) of 4,4'-butylidenebis(3-methyl-6-t-butylphenol), 31.0 g. (0.1 mol) of triphenyl phosphite and a small piece of sodium, about the size of one-half of a grain of rice. The mixture was heated under vacuum (1–2 mm.) until an equivalent amount of phenol had been collected in the trap (0.1 mol, 9.4 g.). There was recovered a quantitative yield of the desired product, Compound XXII, as evidenced by elemental analysis, molecular weight, and NMR analysis.

EXAMPLE 8

Again, using the procedure of Example 6, 22.8 g. (0.1 mol) of 4,4'-isopropylidenebisphenol, 31.0 g. (0.1 mol) of triphenyl phosphite, and a small piece of sodium were placed in the flask and the mixture heated under vacuum until 9.4 g. (0.1 mol) of phenol had been collected. A quantitative yield of Compound XXIV was obtained.

As can be seen from the data in the following tables, the arylphosphites, Compounds XXII, XXIII and XXIV, are effective stabilizers for polypropylene. Polymers stabilized with these new compounds have improved color as shown in Table IV. Again, the use of a zinc salt, such as zinc 2-ethylhexanoate, further improves the color.

TABLE IV

*Oxidative stability of polypropylene containing the new stabilizers*

| Sample No. | Stabilizer System [a] | Wt. Percent | Oxidative, Stability Days [b] |
|---|---|---|---|
| 696 | Dilaurylthiodipropionate, Compound XXII. | 0.3, 0.1 | 47 |
| 727 | do | 0.3, 0.1 | 54 |
| 730 | Dilaurylthiodipropionate, Compound XXIII. | 0.3, 0.1 | 56 |
| 546 | Dilaurylthiodipropionate, Compound XXIV. | 0.3, 0.1 | 35 |
| 742 | do | 0.3, 0.1 | 37 |

[a] The polymer used was solid polypropylene.
[b] 303° F., 10 cc. air/min.

TABLE V

*Comparison of the oxidative stability and color of polypropylene containing the new stabilizers*

| Sample No. | Stabilizer System [a] | Wt. percent | Color of Pad | Oxidative Stability, Days [b] |
|---|---|---|---|---|
| 759 | DLTDP [c] | 0.3 | White | ½ |
| 589 | DLTDP,[c] 4,4'-butylidenebis (3-methyl-6-t-butylphenol) | 0.3, 0.1 | Lt. brown | 4 |
| 743 | Compound XXII | 0.1 | Off white | 1 |
| 696 | DLTDP,[c] Compound XXII | 0.3, 0.1 | ___do___ | 47 |
| 699 | Sample No. 696 with 0.02% zinc 2-ethyl-hexanoate | | White | |
| 521 | DLTDP,[c] 4,4'-methylidenebis (3-methyl 6-t-butylphenyl) | 0.3, 0.1 | Lt. Brown | 4 |
| 744 | Compound XXIII | 0.1 | Off white | 3 |
| 730 | DLTDP,[c] Compound XXIII | 0.3, 0.1 | ___do___ | 56 |
| 428 | DLTDP,[c] 4,4'-isopropylidenebisphenol | 0.3, 0.1 | ___do___ | 20 |
| 746 | Compound XXIV | 0.3, 0.1 | ___do___ | 1 |
| 546 | DLTDP,[c] Compound XXIV | 0.3, 0.1 | ___do___ | 35 |
| 742 | DLTDP,[c] Compound XXIV | 0.3, 0.1 | ___do___ | 37 |

[a] The polymer used was solid polypropylene.
[b] 303° F., 10 cc. air/min.
[c] Dilaurylthiodipropionate.

EXAMPLE 9

Compound XXI was prepared as follows: Sodium sand was prepared in toluene using 0.5 mol of sodium. Thereafter, 0.5 mol of 2,2'-methylenebis-(4-methyl-6-t-butylphenol) was dissolved in 50 ml. of benzene added from a dropping funnel, the temperature being maintained at 30° C. After all of the sodium had reacted 0.55 mol of phosphorus trichloride in 100 ml. of benzene was added in one portion and the mixture was held at 30° C. for 60 hours. The excess phosphorus trichloride and then the solvent were removed under vacuum. The resulting solid was taken up in heptane and washed with water until neutral. It was then dried over alumina and the solvent partly removed under vacuum on a rotating evaporator. The mixture was allowed to stand and 17 grams of a white solid was obtained having a melting point of 159° C. On analysis it was found that the product contained 7.3% of phosphorus and had a composition with the empirical formula of $C_{23}H_{31}PO_3$.

The analysis of the compound showed the following:

NMR Analysis

| Hydrogen | Theory | Found |
|---|---|---|
| Ring | 4 | 3.8 |
| Bridge | 2 | 2.2 |
| Methyl | 6 | 5.7 |
| t-Butyl | 18 | 18 |

The present invention will be further illustrated by the following data which is presented in Table VI which represents the stabilizing efficiency of a phosphonate compound of the present invention in polypropylene. The phosphonate compound was employed in the polypropylene in conjunction with commercially available stabilizers. Table VI, which follows, shows the effect of the composition of the present invention in resisting outdoor aging on exposure thereof.

TABLE VI

*Stabilizing efficiency of compound XXI in polypropylene*

| Sample Number | Stabilizer System | Amount | Percent Retention After Outdoor Aging (75 mils) | | | | | | Fadeometer, Days to Craze |
|---|---|---|---|---|---|---|---|---|---|
| | | | 3 Months | | 6 Months | | 12 Months | | |
| | | | Tensile | Elong. | Tensile | Elong. | Tensile | Elong. | |
| 1 | Cyanamid 2246,[a] Cmpd. XXI | 0.1, 0.5 | 100 | 100 | 100 | 100 | 100 | 10 | 22 |
| 2 | Cyanamid 2246,[a] Cmpd. XXI, UV-314 [b] | 0.1, 0.5, 0.25 | 100 | 100 | 100 | 100 | 95 | 95 | 82 |
| 3 | Cyanamid 2246,[a] UV-314 [b] | 0.1, 0.25 | 100 | 100 | 100 | <10 | 85 | | 14 |
| 4 | Cyanamid 2246,[a] Tinuvin-P [c] | 0.1, 0.25 | 100 | 100 | 100 | 20 | 90 | 10 | 6 |
| 5 | Cyanamid 2246,[a] Ferro AM-101 [d] | 0.1, 0.25 | 100 | 100 | 100 | 10 | 75 | <10 | 15 |
| 6 | Cyanamid 2246 [a] | 0.1 | 100 | 20 | 74 | 10 | 50 | <10 | 6 |

[a] Commercially available stabilizer, 2,2'-methylenebis-(4-methyl-6-t-butylphenol), American Cyanamid Co.
[b] Commercial ultraviolet stabilizer, 2,2'-dihydroxy-4-octoxy-benzophenone, American Cyanamid Co.
[c] Commercial ultraviolet stabilizer, 2(2'-hydroxy-5'-methyl phenyl) benzotriazole, Geigy Industrial Chemicals.
[d] Commercial ultraviolet stabilizer, nickel complex of 2,2'-thiobis [4-(1,1,3,3-tetramethylbutyl) phenol], Ferro Corporation.

The data in Table VI illustrates that Compound XXI (2,2'-methylene bis(4-methyl-6-t-butyl phenyl) phosphonate) in conjunction with other stabilizers, allows the formation of a composition which is resistant to ultraviolet light.

The present invention is quite important and useful in that a stable polyolefin is provided which is resistant to degradation by oxygen and heat. This is important and useful in that molded or extruded articles may be prepared from the costabilized polyolefin, which articles resist attack by oxygen and heat. The stabilized polyolefin may be used in forming films for wrapping foodstuffs and in making filaments for manufacture of fibers for ultimate use in clothing and the like. Articles such as rope and molded and extruded materials, such as pipe, and other articles of commerce may be prepared from the composition of the present invention.

The nature and objects of the present invention having been completely described and illustrated, what we wish to claim as new and useful and secure by Letters Patent is:

1. A compound selected from the group consisting of:

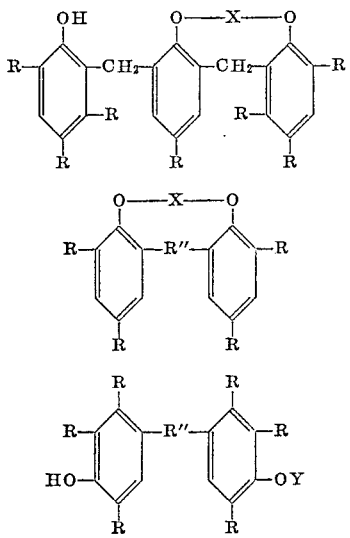

Where:

X is selected from the following: >P—OR'; >P—R';

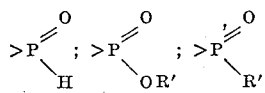

and Y is selected from the following —P(OR')$_2$;

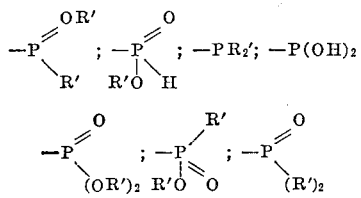

R is hydrogen, an alkyl group having 1 to 16 carbon atoms, or an aryl group, or a combination thereof;
R' is an alkyl group having 1 to 16 carbon atoms or an aryl group; and
R" is an alkylidene having 1 to 16 carbon atoms or an aryl-substituted alkylidene.

2. A compound selected from the group consisting of:

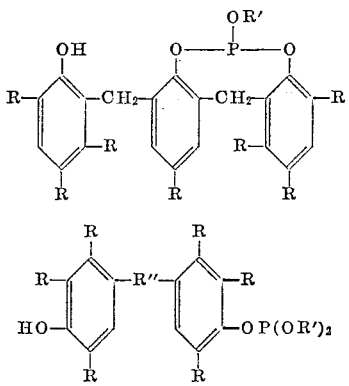

Where:

R is selected from the group consisting of hydrogen, an alkyl group having 1 to 16 carbon atoms and a single ring aryl group; R' is selected from the group consisting of an alkyl group having 1 to 16 carbon atoms and a single ring aryl group; and R" is selected from the group consisting of an alkylidene having from 1 to 16 carbon atoms and an aryl-substituted alkylidene.

3. Mono-diphenylphosphite of 4,4'-butylidene-bis(3-methyl-6-t-butylphenol).

4. Mono-diphenylphosphite of 4,4'-methylenebis(3-methyl-6-t-butylphenol).

5. Mono-diphenylphosphite of 4,4'-isopropylidenebisphenol.

6. Mono-diphenylphosphite of 4,4'-methylenebis(2,6-di-t-butylphenol).

7. The compound:

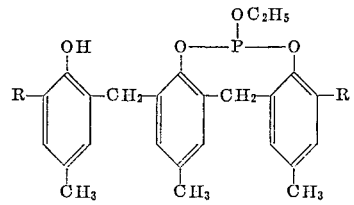

Where:

R is an alkyl group having 1 to 16 carbon atoms.

8. The compound of claim 7 where R is a tertiary butyl group.

9. The compound:

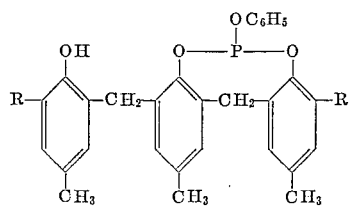

Where:

R is an alkyl group having 1 to 16 carbon atoms.

10. The compound of claim 9 where R is a tertiary butyl group.

11. A composition containing a solid polyolefin of an alpha olefin having 2 to 8 carbon atoms in the molecule and a stabilizing amount of the compound:

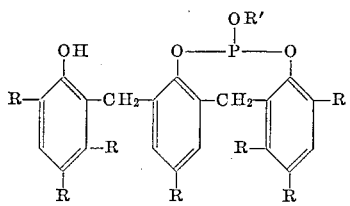

Where:

R is selected from hydrogen, the alkyl groups having 1 to 16 carbon atoms and the single ring aryl group; and R' is selected from the alkyl groups having 1 to 16 carbon atoms and the single ring aryl group.

12. The composition of claim 11 in which the compound is:

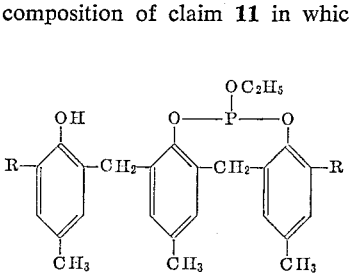

Where:

R is an alkyl group having 1 to 16 carbon atoms.

13. A composition in accordance with claim 11 in which the polymer is polyethylene.

14. A composition in accordance with claim 11 in which the polymer is polypropylene.

15. The composition of claim 11 in which the compound is:

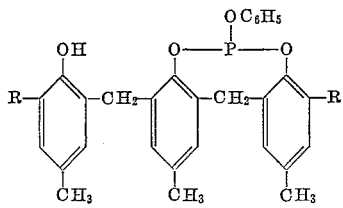

Where:

R is an alkyl group having 1 to 16 carbon atoms.

16. 2,2'-methylenebis(4 - methyl-6-t-butylphenyl)phosphonate.

17. A composition containing a solid polyolefin of an alpha olefin having 2 to 8 carbon atoms in the molecule and a compound selected from the group consisting of:

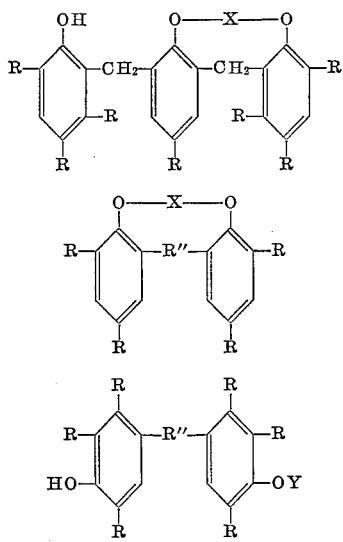

Where:

X is selected from the following: >P—OR'; >P—R';

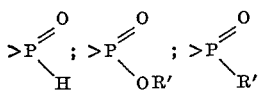

and Y is selected from the following: —P(OR')₂;

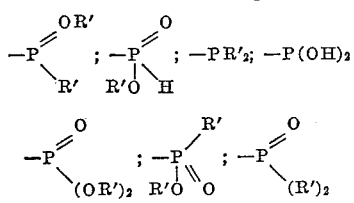

R is hydrogen, an alkyl group having 1 to 16 carbon atoms, or an aryl group, or a combination thereof;
R' is an alkyl group having 1 to 16 carbon atoms or an aryl group; and
R'' is an alkylidene having 1 to 16 carbon atoms or an aryl-substituted alkylidene.

18. A composition containing a solid polyolefin of an alpha olefin having 2 to 8 carbon atoms in the molecule and a compound selected from the group consisting of:

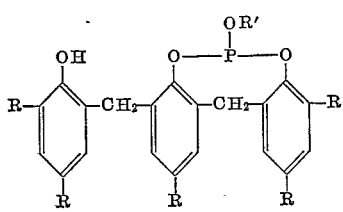

and

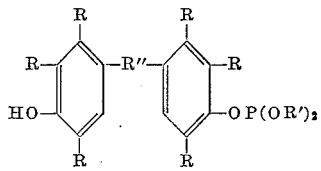

Where:

R is selected from hydrogen, the alkyl group having 1 to 16 carbon atoms and the single ring aryl group; R' is selected from the group consisting of an alkyl group having 1 to 16 carbon atoms and a single ring aryl group; and R'' is selected from the group consisting of an alkylidene having from 1 to 16 carbon atoms and an aryl-substituted alkylidene.

19. A composition containing a solid polyolefin of an alpha olefin having 2 to 8 carbon atoms in the molecule and a stabilizing amount of the compound:

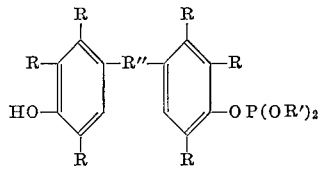

Where:

R is selected from hydrogen, the alkyl group having 1 to 16 carbon atoms and the single ring aryl group; R' is selected from the group consisting of an alkyl group having 1 to 16 carbon atoms and a single ring aryl group; and R'' is selected from the group consisting of an alkylidene having from 1 to 16 carbon atoms and an aryl-substituted alkylidene.

20. The compound of claim 19 in which the compound is:

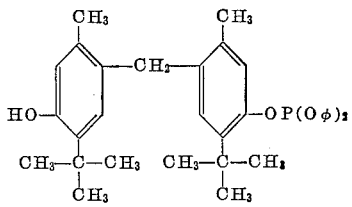

Where:

φ is phenyl.

21. The composition according to claim 18 together with a stabilizing amount of an alkyl sulfide selected from the group consisting of dilaurylthiodipropionate, ditridecylthiodipropionate, distearyl thiodipropionate, bis(tetradecylmercapto) - p - xylylene, bis(octadecylmercapto)-p-xylylene, 19,24-dithiotetracontane, 19,25-dithiohentetetracontane, and dicetylsulfide.

22. A stable composition comprising a solid polymer of an alpha-olefin having 2 to 8 carbon atoms in the molecule and a stabilizing amount of 2,2'-methylenebis(4-methyl-6-t-butylphenyl)phosphonate.

No references cited.

LEON J. BERCOVITZ, *Primary Examiner.*

H. E. TAYLOR, *Assistant Examiner.*